US006495614B1

(12) United States Patent
Kamohara et al.

(10) Patent No.: US 6,495,614 B1
(45) Date of Patent: Dec. 17, 2002

(54) DENTURE TEMPORARY RELINING MATERIAL COMPOSITION

(75) Inventors: Hiroshi Kamohara, Tokyo (JP); Makiko Takeo, Tokyo (JP); Masahiro Sukekawa, Tokyo (JP)

(73) Assignee: GC Corporation, Tokyo (JP)

( * ) Notice: Subject to any disclaimer, the term of this patent is extended or adjusted under 35 U.S.C. 154(b) by 0 days.

(21) Appl. No.: 09/499,677

(22) Filed: Feb. 8, 2000

(30) Foreign Application Priority Data

Mar. 4, 1999 (JP) .......................................... 11-056893

(51) Int. Cl.$^7$ ................................................. A61K 6/08
(52) U.S. Cl. ...................... 523/116; 523/118; 523/120; 523/731; 523/862; 528/31; 528/32
(58) Field of Search ................................ 523/116, 118, 523/120, 862, 731; 528/31, 32

(56) References Cited

U.S. PATENT DOCUMENTS

| 4,550,030 | A |   | 10/1985 | Ohi et al. |
| 4,604,142 | A |   | 8/1986 | Kamohara et al. |
| 4,814,011 | A |   | 3/1989 | Kamohara et al. |
| 4,909,847 | A |   | 3/1990 | Ohi et al. |
| 4,911,759 | A |   | 3/1990 | Ohi et al. |
| 5,203,914 | A |   | 4/1993 | Futami et al. |
| 5,513,987 | A | * | 5/1996 | Hosoi et al. ............. 433/168.1 |
| 5,631,320 | A |   | 5/1997 | Kamohara et al. |
| 5,637,628 | A |   | 6/1997 | Kamohara et al. |
| 5,907,002 | A | * | 5/1999 | Kamohara et al. .......... 523/109 |
| 5,952,400 | A | * | 9/1999 | Hosoi et al. ................ 523/120 |
| 6,093,755 | A | * | 7/2000 | Kamohara et al. .......... 523/118 |

FOREIGN PATENT DOCUMENTS

| EP | 0614655 A1 | * | 9/1994 |
| GB | 2314849 A | * | 1/1998 |
| GB | 2337524 A | * | 11/1999 |
| JP | 07291820 A | * | 11/1995 |

OTHER PUBLICATIONS

Abstract—PUB No.: JP07291820 A.*

* cited by examiner

*Primary Examiner*—Margaret Medley
(74) *Attorney, Agent, or Firm*—Oblon, Spivak, McClelland, Maier & Neustadt, P.C.

(57) ABSTRACT

A denture temporary relining material composition is disclosed, including (A) 100 parts by weight of an organopolysiloxane containing at least two alkenyl groups in one molecule and having a viscosity of from 0.5 to 20 Pa.s at 25° C.; (B) from 0.1 to 40 parts by weight of an organohydrogen polysiloxane containing at least three hydrogen atoms directly bonded to a silicon atom in one molecule; (C) from 10 to 500 ppm, based on the total amount of the components (A) and (B), of a silicone-soluble platinum compound; (D) from 10 to 200 parts by weight of an inorganic filler; (E) from 0.5 to 100 parts by weight of an organopolysiloxane raw rubber containing at least two alkenyl groups in one molecule and having a viscosity of from 1,000 to 20,000 Pa.s at 25° C.; and (F) from 1 to 200 parts by weight of a methylphenyl polysiloxane which is very low in terms of the hardness of a set product, keeps a softness in the oral cavity for a long period of time, does not generate changes in the surface properties, and is not deteriorated even upon immersing in a denture cleanser solution.

7 Claims, No Drawings

DENTURE TEMPORARY RELINING MATERIAL COMPOSITION

BACKGROUND OF THE INVENTION

1. Field of the Invention

The present invention relates to a denture temporary relining material composition that, when, upon setting a denture over a long period of time, a deformation or a strain is generated on an oral mucosa, or a deformation is generated on an alveolar ridge, whereby an adhesion of the denture becomes insufficient, is used for relining of a mucosa face of the denture during a time when such symptoms are improved.

2. Description of the Related Art

When a patient sets a denture over a long period of time, a deformation or a strain is generated on an oral mucosa, or a deformation is generated in the state of an alveolar ridge, whereby the fitting state becomes worse, leading to an insufficient adhesion of the denture. Thus, the denture is liable to come off at the time of opening a mouth or mastication. Usually, in such case, there is taken a treatment such that a relining material with a soft quality is temporarily aligned on a mucosa face of the denture, thereby laboring for recovery from the symptom. The material to be used for this treatment is a denture temporary relining material and is required to have such properties that it is low in hardness and that it is soft. In other words, with its softness, it is intended to not only recover a local deformation or a local strain of the mucosa to an original normal state but also make the adhesion of the denture stable and improve the state of the alveolar ridge. And, after the symptoms have been improved, a new denture is prepared, or a treatment with a relining material is taken such that the denture that has been used so far can be used over a long period of time.

As such temporary relining material is generally used one comprising an acrylic resin as a base material and containing an ethanol and a phthalic acid ester-based plasticizer. In this temporary relining material, the acrylic resin powder is dissolved in ethanol and the phthalic acid ester-based plasticizer to be contained, to form a rubbery material, whereby softness is imparted. However, due to the alcohol and the plasticizer contained in this material being liable to elute out, the material has such properties that it is converted into a very brittle material about one week later. For this reason, a dentist is required to repeat the temporary relining until the symptom of a patient as described above has been improved. Further, the surface of the above-described temporary relining material becomes rough due to the elution of the alcohol and the plasticizer, to thereby likely cause generation of stains, attachment of dental plaques, candida, etc., or the like. Accordingly, not only such is of a problem from the standpoint of oral hygiene, but also there is fear that a new oral disease is induced. In addition, even in case of immersing this temporary relining material in a denture cleanser for the purpose of cleaning off dental plaques, candida, etc., it has such properties that its quality is deteriorated due to an influence of active oxygen in the denture cleanser, and the relining material becomes brittle, whereby its softness is impaired.

In part, a soft lining material is used as a temporary relining material. The soft lining material is a material that has been developed for the purpose of mitigating pain of a patient who is set with a denture or of improving the adhesively of the denture over a long period of time. Its examples include polyolefin-based soft lining materials and acrylic resin-based soft lining materials in addition to silicone-based soft lining materials as disclosed in Japanese Patent Laid-Open No. 291017/1996. Although these soft lining materials are relatively soft and less in degradation in an oral cavity, they are high in hardness as from 30 to 60 as measured in a JIS-A model spring type hardness tester and insufficient in softness as a temporary relining material. Accordingly, it cannot be said that these relining materials have a sufficient effect for recovery of a local deformation or a local strain on an oral mucosa. Further, they involve a defect such that a pain of the mucosa at the time of mastication is not sufficiently mitigated.

SUMMARY OF THE INVENTION

The present invention is aimed to provide a denture temporary relining material composition that is soft so as to have a hardness, as measured in a JIS-A model spring type hardness tester, of from 10 to 20, keeps this softness in an oral cavity over a longer period of time (about several months) as compared with current temporary relining materials, is free from elution of the contents in the oral cavity and change in the surface properties, and that is not deteriorated even after immersion in a denture cleanser.

The inventors of the present invention, took note of a silicone-based soft lining material that is relatively stable in the oral cavity and whose set product has a relatively low hardness. And, they made extensive and intensive investigations for the purpose of developing a material that makes the hardness low (from 10 to 20 as measured in a JIS-A model spring type hardness tester) and does not cause a change in hardness even upon being used in the oral cavity over a long period of time, while keeping the stability of an addition type silicone material to be used for this soft lining material in the oral cavity. As a result, they have successfully developed a denture temporary relining material composition according to the present invention, which is capable of solving the above-described problems accompanied by the current denture temporary relining material compositions, through a combination of a current addition setting silicone material as a basic composition with an organopolysiloxane raw rubber containing at least two alkenyl groups in one molecule and having a viscosity of from 1,000 to 20,000 Pa.s at 25° C., as a component having a function to lowering the hardness, and a methylphenyl polysiloxane.

DETAILED DESCRIPTION OF THE INVENTION

Specifically, the denture temporary relining material composition according to the present invention comprises (A) 100 parts by weight of an organopolysiloxane containing at least two alkenyl groups in one molecule and having a viscosity of from 0.5 to 20 Pa.s at 25° C.; (B) from 0.1 to 40 parts by weight of an organohydrogen polysiloxane containing at least three hydrogen atoms directly bonded to a silicon atom in one molecule; (C) from 10 to 500 ppm, based on the total amount of the components (A) and (B), of a silicone-soluble platinum compound; (D) from 10 to 200 parts by weight of an inorganic filler; (E) from 0.5 to 100 parts by weight of an organopolysiloxane raw rubber containing at least two alkenyl groups in one molecule and having a viscosity of from 1,000 to 20,000 Pa.s at 25° C.; and (F) from 1 to 200 parts by weight of a methylphenyl polysiloxane.

In the denture temporary relining material composition according to the present invention, the components (A) to (D) are similar to the basic components of a current addition setting silicone materials to be used as the soft lining material. The component (A) is an organopolysiloxane containing at least two alkenyl groups in one molecule and having a viscosity of from 0.5 to 20 Pa.s at 25° C., and preferably one that is linear and in which the both end terminals of the molecular chain are hindered with a vinylsilyl group. In this case, the terminal vinyl group may be in plural, or the vinyl group may be contained in the chain.

The organohydrogen polysiloxane as the component (B) is required to contain at least three hydrogen atoms directly bonded to a silicon atom in the molecule thereof and functions as a crosslinking agent. When the amount of the organohydrogen polysiloxane is less than 0.1 part by weight based on 100 parts by weight of the component (A), the setting rate in the oral cavity becomes slow, and the hardness of a set product is lowered. On the other hand, when the amount of the organohydrogen polysiloxane exceeds 40 parts by weight based on 100 parts by weight of the component (A), not only the hardness increases, but also there is generated an inconvenience that bubbles by a hydrogen gas generated during the reaction are formed in a set product.

The silicone-soluble platinum compound as the component (C) is a conventional addition reaction catalyst, and examples thereof include chloroplatinic acid, alcohol-modified chloroplatinic acid, and a complex of chloroplatinic acid with an olefin. Of these is particularly preferred a chloroplatinic acid-vinylsiloxane complex. A suitable amount of the silicone-soluble platinum compound to be added is in the range of from 10 to 500 ppm based on the total amount of the components (A) and (B). When the addition amount of the component (C) is less than 10 ppm based on the total amount of the components (A) and (B), there are disadvantages that not only the setting rate is slow, but also in case where a trace amount of a substance for hindering the catalytic capability of the platinum compound, the setting rate becomes further slow. When the addition amount of the component (C) exceeds 500 ppm, not only the setting rate is too fast, and but also a set product becomes discolored into yellow. It is preferred to use the silicone-soluble platinum compound such as chloroplatinic acid after dissolving in various solvents such as alcoholic solvents, ketone-based solvents, ether-based solvents, and hydrocarbon-based solvents, or a polysiloxane oil, etc.

Examples of the inorganic filler to be used as the component (D) include quartz, cristobalite, diatomaceous earth, fused quartz, glass fibers, titanium dioxide, and fumed silica. The inorganic filler may be made hydrophobic with a surface processing agent. A suitable amount of the inorganic filler is from 10 to 200 parts by weight based on the 100parts by weight of the component (A). When the amount of the inorganic filler is less than 10 parts by weight based on the 100 parts by weight of the component (A), a set product becomes brittle. On the other hand, when the amount of the inorganic filler exceeds 200 parts by weight, the viscosity is too high so that the resistance at the time of kneading is excessively high. Also, the operability for building up on a denture is lowered. Preferably, the amount of the inorganic filler is from 20 to 150 parts by weight based on the 100 parts by weight of the component (A).

The components (E) and (F) are characteristics of the denture temporary relining material composition according to the present invention. The component (E) is an organopolysiloxane raw rubber containing at least two alkenyl groups in one molecule and having a viscosity of from 1,000 to 20,000 Pa.s at 25° C. The alkenyl group in the organopolysiloxane raw rubber is preferably a vinyl group. In addition to the alkenyl group, a methyl group, an ethyl group, a propyl group, a phenyl group, etc. may be contained as an organic group in the organopolysiloxane raw rubber. Of these is preferred a methyl group. Though the organopolysiloxane raw rubber has a structure basically equal to that of the component (A), its viscosity is remarkably high as from 1,000 to 20,000 Pa.s at 25° C. When the organopolysiloxane raw rubber is used together with the component (F) as described later, it brings about effects that not only the hardness of a set product is lowered to a desired hardness, but also a suitable viscosity is given to a paste, thereby making the fluidity in the oral cavity proper. In addition, there is given an effect that a lowering in the strength to be generated due to the lowering in hardness of a set product is inhibited. The viscosity of the organopolysiloxane raw rubber containing at least two alkenyl groups in one molecule is from 1,000 to 20,000 Pa.s at 25° C. However, when the viscosity of the organopolysiloxane raw rubber containing at least two alkenyl groups in one molecule is less 1,000 Pa.s at 25° C., the hardness at the time of combining with the component (F) is not sufficiently lowered. On the other hand, when it exceeds 20,000 Pa.s at 25° C., the paste viscosity is too high so that it is difficult to make a paste. A suitable amount of the component (E) to be compounded is from 0.5 to 100 parts by weight based on 100 parts by weight of the component (A). When the amount of the component (E) is less than 0.5 parts by weight based on the 100 parts by weight of the component (A), the effects of the component (E) are not sufficiently exhibited. On the other hand, when the amount of the component (E) exceeds 100 parts by weight, the kneading properties are lowered. The amount of the component (E) to be compounded is preferably from 5 to 50 parts by weight based on 100 parts by weight of the component (A).

As the methylphenyl polysiloxane to be used as the component (F) is used one represented by the following general formula:

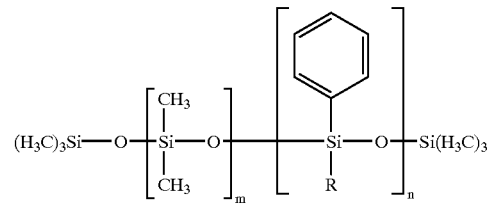

wherein R is a methyl group or a phenyl group; and m and n are each an integer, m>0, n>0, and m+n=1~2000.

The methylphenyl polysiloxane is a non-reactive oil, and when it is used together with the above-described component (E), not only the hardness of a set product can be more effectively lowered, but also the strength is not lowered. An amount of the methylphenyl polysiloxane to be used is in the range of from 1 to 200 parts by weight based on 100 parts by weight of the component (A). When the amount of the methylphenyl polysiloxane is less than 1 part by weight based on 100 parts by weight of the component (A), the effects are not sufficient. On the other hand, when the amount of the methylphenyl polysiloxane exceeds 200 part by weight, a set product is liable to be deformed and the hardness is also lowered due to the bite pressure. The amount of the component (F) to be used is preferably from 10 to 150 parts by weight based on 100 parts by weight of the component (A).

In the denture temporary relining material composition according to the present invention, so far as its characteristics are not lost, various additives such as inorganic or organic colorants and bacterides can be used.

Next, the denture temporary relining material composition according to the present invention is described in more detail with reference to the following Examples, but it should not be construed that the invention is limited there to.

EXAMPLE 1

A base paste and a catalyst paste each having the following formation were prepared.

(Base Paste)

Dimethyl polysiloxane, whose both 100 parts by weight terminal ends are hindered with a methyl vinylsiloxy group, having a viscosity of 20 Pa.s at 25° C.

Linear methylhydrogen polysiloxane 3 parts by weight containing 40 mole % of a methylhydrogen siloxane unit Quartz 20 parts by weight Dimethyl polysiloxane raw rubber 10 parts by weight containing 0.05 mole % of a vinyl group and having a viscosity of 10,000 Pa.s at 25° C.

Methylphenyl polysiloxane (content 20 parts by weight of phenyl group: 25 mole %)

(Catalyst Paste)

Dimethyl polysiloxane, whose both 100 parts by weight terminal ends are hindered with a methyl vinylsiloxy group, having a viscosity of 20 Pa.s at 25° C.

A silicone oil solution containing 3 parts by weight 0.5% by weight of a 1,3-divinyl tetramethyldisiloxane-platinum complex Fumed silica 20 parts by weight Dimethyl polysiloxane raw rubber 10 parts by weight containing 0.05 mole % of a vinyl group and having a viscosity of 10,000 Pa.s at 25° C.

Methylphenyl polysiloxane (content 20 parts by weight of phenyl group: 25 mole %)

Equal amounts of the base paste and the catalyst paste were taken and kneaded with each other by means of a spatula for 30 seconds, and the kneaded material was poured into a metal ring having an inner diameter of 20 mm and a height of 8 mm. The top and bottom of the metal ring were sandwiched by acrylic resin plates and allowed to stand for setting in water at 37° C. for 5 minutes. Thereafter, a set product was taken out from the mold and immersed in water at 37° C. One day after immersing, the hardness of the surface of the specimen was measured in a JIS-A model spring type hardness tester. A similar test was also carried out one month after immersing in water at 37° C. Further, in order to examine any change by immersing in a denture cleanser, the pastes were kneaded with each other in the same manner as described above, and the kneaded material was poured into a mold having an inner diameter of 30 mm and a height of 2 mm, followed by allowing to stand for setting in water at 37° C. for 5 minutes. Thereafter, a set product was immersed in a denture cleanser (a trade name "Pika", made by Rohto Pharmaceutical Co., Ltd.) solution, and one day after immersing, the denture cleanser solution was exchanged with new one. This operation was repeated for 7 days, and any change of the surface of the set product was visually observed. Further, a tear test was carried out in the following manner. That is, equal amounts of the base paste and the catalyst paste were taken and kneaded with each other in the same manner as described above. The kneaded material was poured into a B type mold according to JIS K6301 and allowed to stand for setting in water at 37° C. for 5 minutes. Thereafter, a set product was taken out from the mold and immersed in water at 37° C. One day after immersing, the tear test was carried out. The results obtained are summarized and shown in Table 1.

EXAMPLE 2

A base paste and a catalyst paste each having the following formation were prepared, and various testes were carried out in the same manners as in Example 1. The results obtained are summarized and shown in Table 1.

(Base Paste)

Dimethyl polysiloxane, whose both 100 parts by weight terminal ends are hindered with a methyl vinylsiloxy group, having a viscosity of 3 Pa.s at 25° C.

Linear methylhydrogen polysiloxane 3 parts by weight containing 40 mole % of a methylhydrogen siloxane unit Quartz 100 parts by weight Dimethyl polysiloxane raw rubber 30 parts by weight containing 0.07 mole % of a vinyl group and having a viscosity of 5,000 Pa.s at 25° C.

Methylphenyl polysiloxane (content 100 parts by weight of phenyl group: 25 mole %)

(Catalyst Paste)

Dimethyl polysiloxane, whose both 100 parts by weight terminal ends are hindered with a methyl vinylsiloxy group, having a viscosity of 3 Pa.s at 25° C.

A silicone oil solution containing 3 parts by weight 0.5% by weight of a 1,3-divinyl tetramethyldisiloxane-platinum complex Quartz 100 parts by weight Dimethyl polysiloxane raw rubber 30 parts by weight containing 0.07 mole % of a vinyl group and having a viscosity of 5,000 Pa.s at 25° C.

Methylphenyl polysiloxane (content 100 parts by weight of phenyl group: 25 mole %)

EXAMPLE 3

A base paste and a catalyst paste each having the following formation were prepared, and various testes were carried out in the same manners as in Example 1. The results obtained are summarized and shown in Table 1.

(Base Paste)

Dimethyl polysiloxane, whose both 100 parts by weight terminal ends are hindered with a methyl vinylsiloxy group, having a viscosity of 1 Pa.s at 25° C.

Linear methylhydrogen polysiloxane 3 parts by weight containing 40 mole % of a methylhydrogen siloxane unit Quartz 150 parts by weight Dimethyl polysiloxane raw rubber 50 parts by weight containing 0.02 mole % of a vinyl group and having a viscosity of 10,000 Pa.s at 25° C.

Methylphenyl polysiloxane (content 150 parts by weight of phenyl group: 25 mole %)

(Catalyst Paste)

Dimethyl polysiloxane, whose both 100 parts by weight terminal ends are hindered with a methyl vinylsiloxy group, having a viscosity of 2 Pa.s at 25° C.

A silicone oil solution containing 3 parts by weight 0.5% by weight of a 1,3-divinyl tetramethyldisiloxane-platinum complex Fused quartz 50 parts by weight Dimethyl polysiloxane raw rubber 30 parts by weight containing 0.02 mole % of a vinyl group and having a viscosity of 10,000 Pa.s at 25° C.

Methylphenyl polysiloxane (content 150 parts by weight of phenyl group: 25 mole %)

Comparative Example 1

By using a commercially available denture temporary relining material (a trade name "GC Soft Liner", made by GC Corporation), the kneading was carried out based on the description of the specification, and various tests were carried out in the same manners as in Example 1. The results obtained are summarized and shown in Table 1.

Comparative Example 2

Abase paste and a catalyst paste each having the following formation were prepared, and various testes were carried out in the same manners as in Example 1. The results obtained are summarized and shown in Table 1.

(Base Paste)

Dimethyl polysiloxane, whose both 100 parts by weight terminal ends are hindered with a methyl vinylsiloxy group, having a viscosity of 20 Pa.s at 25° C.

Linear methylhydrogen polysiloxane 3 parts by weight containing 40 mole % of a methylhydrogen siloxane unit Quartz 20 parts by weight (Catalyst Paste)

Dimethyl polysiloxane, whose both 100 parts by weight terminal ends are hindered with a methyl vinylsiloxy group, having a viscosity of 2 Pa.s at 25° C.

A silicone oil solution containing 3 parts by weight 0.5% by weight of a 1,3-divinyl tetramethyldisiloxane-platinum complex Fumed silica 20 parts by weight

TABLE 1

| | | Example 1 | Example 2 | Example 3 | Comparative Example 1 | Comparative Example 2 |
|---|---|---|---|---|---|---|
| Hardness (JIS-A) | After one day | 17 | 15 | 12 | 15 | 39 |
| | After one month | 19 | 16 | 13 | 85 | 43 |
| Tear strength (N/m) | | 7.8 | 7.6 | 6.3 | 4.3 | 4.8 |
| Surface properties after immersing in denture cleanser | | The surface had luster and did not change as compared with that prior to immersing. | The surface had luster and did not change as compared with that prior to immersing. | The surface had luster and did not change as compared with that prior to immersing. | The surface became rough and did no have luster. | While the luster of the surface was slightly inferior but did not change as compared with that prior to immersing. |

From Table 1, it has been confirmed that the denture temporary relining material composition according to the present invention has a very low hardness similar to the currently commercially available denture temporary relining materials, is free from any lapsing change in hardness, and keeps the functions as a denture temporary relining material in the oral cavity. Also, it has been confirmed that because the denture temporary relining material composition according to the present invention is free from any change by immersing in a denture cleanser, it can be cleaned with confidence and keep the hygiene in the oral cavity well. In addition, it has been confirmed that nevertheless the denture temporary relining material composition according to the present invention is low in hardness, it has a high tear strength and that it can be used with confidence in the oral cavity. In contrast, in the formulation of Comparative Example 2 in which the components (E) and (F) are not contained, the hardness is very high as compared with Examples 1 to 3, and therefore, it has been confirmed that the formulation of Comparative Example 2 is improper as the denture temporary relining material.

As described above in detail, the denture temporary relining material composition according to the present invention is very low in terms of the hardness of a set product as from 10 to 20 as measured in a JIS-A model spring type hardness tester, keeps a softness in the oral cavity for a long period of time as compared with the commercially available denture temporary relining materials, does not substantially generate changes in the surface properties, and has superior characteristics such that it is not deteriorated even upon immersing in a denture cleanser. Thus, it can markedly improve the defects which have been considered in the current denture temporary relining materials, and therefore, it greatly contributes to the dental field.

While the present invention has been described in detail and with reference to specific embodiments thereof, it will be apparent to one skilled in the art that various changes and modifications can be made therein without departing from the spirit and scope thereof.

What is claimed is:

1. A denture temporary relining material composition comprising:

(A) 100 parts by weight of an organopolysiloxane containing at least two alkenyl groups in one molecule and having a viscosity of from 0.5 to 20 Pa.s at 25° C.;

(B) from 0.1 to 40 parts by weight of an organohydrogen polysiloxane containing at least three hydrogen atoms directly bonded to a silicon atom in one molecule;

(C) from 10 to 500 ppm, based on the total amount of the components (A) and (B), of a silicone-soluble platinum compound;

(D) from 10 to 200 parts by weight of an inorganic filler;

(E) from 0.5 to 100 parts by weight of an organopolysiloxane raw rubber containing at least two alkenyl groups in one molecule and having a viscosity of from 1,000 to 20,000 Pa.s at 25° C.; and (F) from 1 to 200 parts by weight of a methylphenyl polysiloxane.

2. The denture temporary relining material of claim 1, wherein the composition has a hardness, as measured in a JIS-A model spring type hardness tester, of from 10 to 20.

3. The denture temporary relining material of claim 1, wherein component (A) is linear and wherein both end terminals of the molecular chain are hindered with a vinyl-silyl group.

4. The denture temporary relining material of claim 1, wherein the alkenyl groups of component (E) are vinyl groups.

5. The denture temporary relining material of claim 1, wherein component (E) also contains methyl groups.

6. The denture temporary relining material of claim 1, wherein component (F) has the following formula:

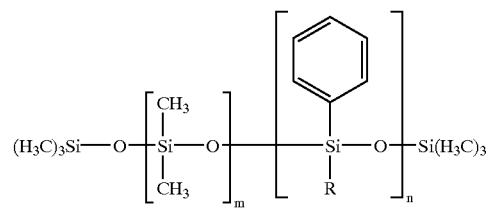

wherein R is methyl or phenyl, m and n are each an integer, m>0, n>0 and m+n=1~2000.

7. The denture temporary relining material of claim 1, wherein the amount of component (F) is 10 to 150 parts by weight.

* * * * *